Dec. 5, 1967    J. E. BROOK    3,355,806
TEST STANDARD DEVICE FOR DISCRETE ANGLE VALUES
Filed March 2, 1964    3 Sheets-Sheet 1

INVENTOR.
JAMES E. BROOK
BY
ATTORNEY

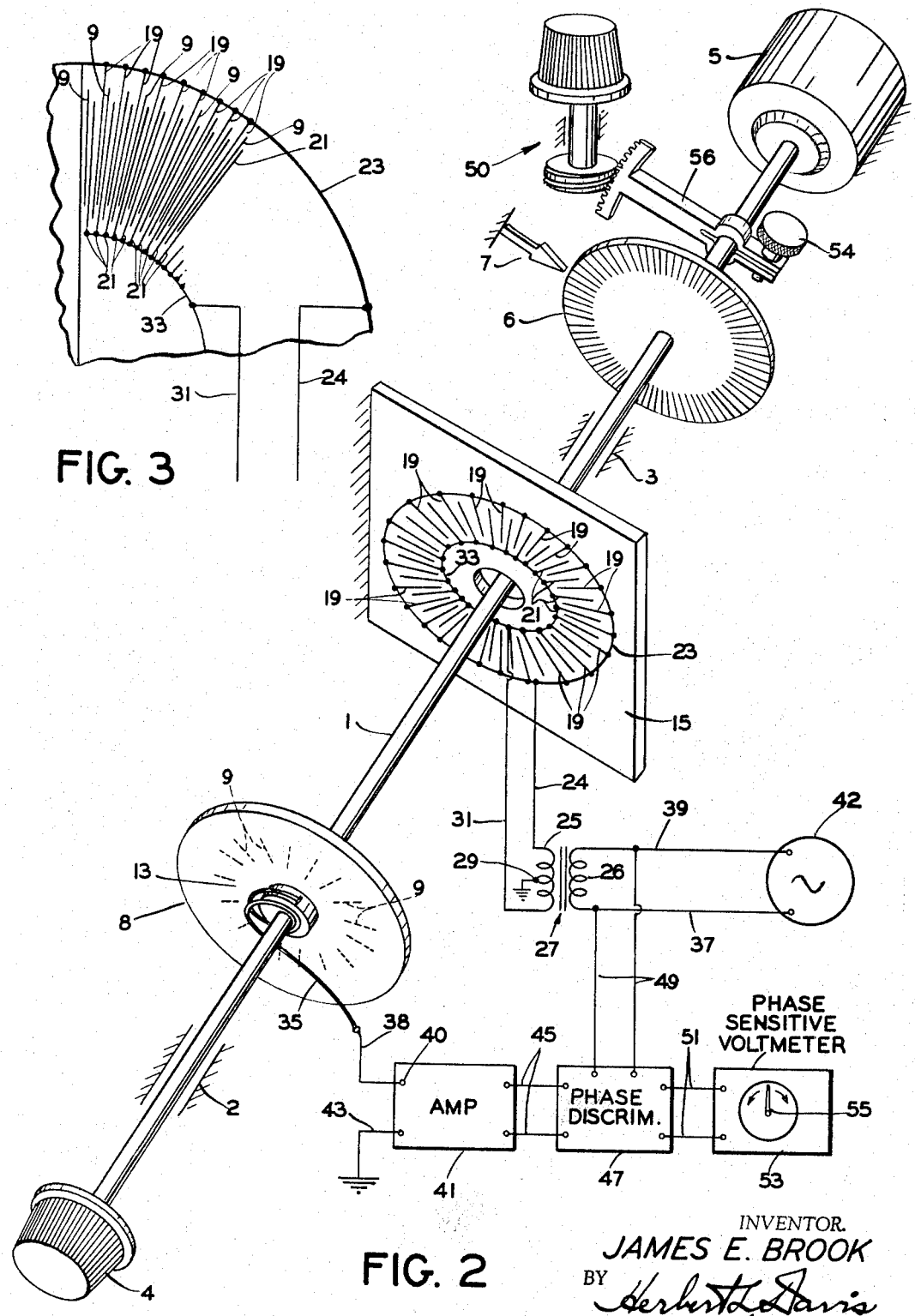

INVENTOR.
JAMES E. BROOK
BY Herbert L. Davis
ATTORNEY

United States Patent Office 3,355,806
Patented Dec. 5, 1967

3,355,806
TEST STANDARD DEVICE FOR DISCRETE ANGLE VALUES
James E. Brook, Maywood, N.J., assignor to The Bendix Corporation, Teterboro, N.J., a corporation of Delaware
Filed Mar. 2, 1964, Ser. No. 348,394
4 Claims. (Cl. 33—1)

This invention relates to a test standard device for discrete angle values and more particularly to a standard angle generator device providing ultra accuracy at discrete angle values such as at every degree point on a scale from 0° to 359°.

Heretofore, in the usual application of an angle standard, the device to be checked or calibrated has been examined only at discrete degree points prescribed by an arbitrary test program.

In the present invention, the accuracy of the test standard device derives from a mathematical analysis hereinafter developed which proves the theoretical absence of error at all discrete scale points under conditions which are physically realizable.

An object of the invention is to provide a standard angle generating device in which accurate coupling of circular scales may be effected by means of an electrostatic (or electromagnetic) field which produces a superposition of signal information from all scale elements and which effect may not be duplicated in an ideal sense by a mechanical analogue, and for this reason the standard angle generator device provides greater accuracy than may be effected by the best mechanical angle standard.

Another object of the invention is to provide a standard angle generating device in which greater accuracy is achieved through distributively coupled circular scales to produce a suppressed carrier-amplitude-modulated signal, and in which the circular scales are so coupled that the signal nulls define a desired degree point while a visual scale is arranged to give a coarse indication of the degree count at such null point.

Another object of the invention is to provide such a standard angle generating device including capacitively coupled circular scales which may be reproduced from a master template by a photoetching or silk screen process at low cost and in which extreme accuracy obtains at discrete degree points without requiring precision machining.

Another object of the invention is to provide a novel angle generator test device in which two circular scales may be constructed by a dividing engine and in which the scales are partitioned by the point interval method of separation so as to provide N number of capacitive lines, for example 360 equally angularly spaced apart capacitive lines on one of the scales arranged in cooperative relation with a second circular scale having one half the number of capacitive lines, for example 180 equally angularly spaced apart and so partitioned and arranged that the capacitive lines of the two scales may be coupled electrostatically, with the capacitive lines or elements of the second scale being angularly movable relative to the capacitive lines of the first scale so that a variable capacitor is formed between the capacitive lines of the first and second scales, the capacitance of which variable capacitor may be electrostatically balanced to define a degree point when the capacitive lines of the second scale have been angularly adjusted in relation to the capacitive lines of the first scale to a substantially intermediate balanced minimum capacitance position.

Another object of the invention is to provide a novel angle generator test device including a pair of annular rings lying in two parallel planes with centers lying on a common axis perpendicular to the planes and including on opposing faces of the pair of annular rings scale markings of conductive quanta in which each of the conductive quanta on the face of one of the rings forms between any two opposing conductive quanta on the other ring a capacitance which varies approximately as the cosine function of the adjusted angular relation of the scale markings about a small angle $\theta$ where zero is defined as the position of minimum join which corresponds to the precise degree point with ultra accuracy, while the degree count at such point may be indicated roughly on a visual scale.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for a definition of the limits of the invention.

In the drawings:

FIGURE 2 is an exploded perspective diagrammatic view of the device of FIGURE 1 illustrating the arrangement of the distributively coupled circular scale plates and the operative connection thereof into an indicator circuit for the discrete angle generator test device.

FIGURE 3 is a fragmentary diagrammatic view illustrating the distributive coupling relationship between the capacitive lines of the scale plates of FIGURES 1 and 2.

Figure 1:
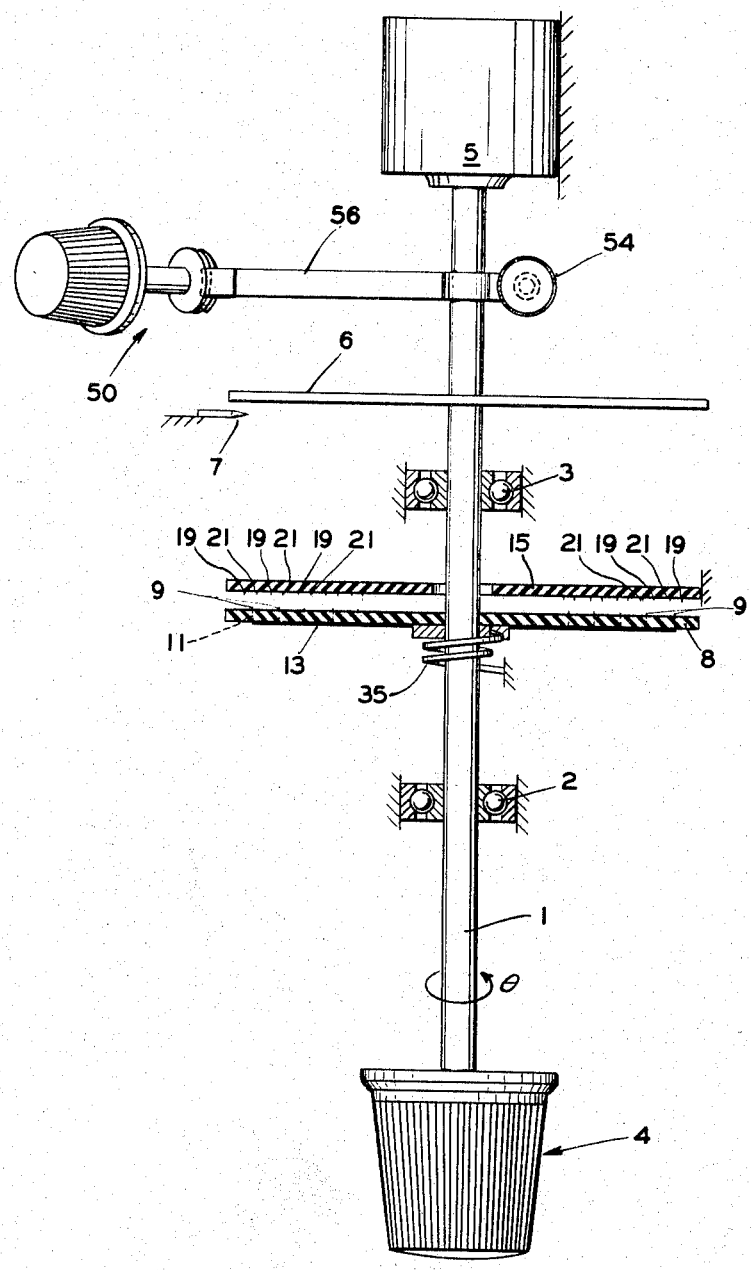
FIGURE 1 is a diagrammatic view of a test standard discrete angle generator device embodying the invention.

Referring to the drawing of FIGURES 1 and 2, there is indicated by the numeral 1 a main control shaft rotatably mounted in bearings 2 and 3 and operatively positioned by a hand operated knob 4 mounted at one end of the shaft 1. Connected at an opposite end of the shaft 1 is a rotor element of a synchro 5 or other device, the angular position of which is to be tested. Affixed to the shaft 1 and angularly positioned thereby is a circular visual indicator plate 6 bearing degree indicator line 0° to 359° arranged in cooperative relation with a pointer 7 in a conventional manner. A second adjustable plate 8 is affixed to the shaft 1.

Figure 4:
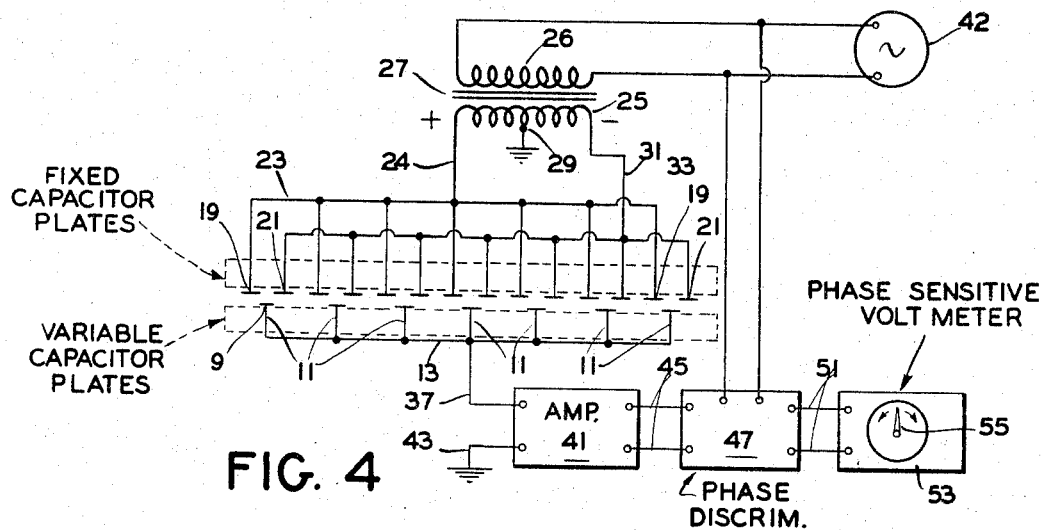
FIGURE 4 is a schematic view illustrating the operation of the device of FIGURES 1 and 2 in a discrete angle indicating system.

The adjustable plate 8 may be formed of a suitable electrical insulating material having stable mechanical properties such as glass, porcelain, or a suitable plastic electrical insulating material. There is affixed to one side of the plate 8 radiating electrical capacitive lines 9 formed of a suitable electrically conducting material such as copper, silver, carbon, or other suitable electrical conductive material which may be applied thereto by the photo etch, silk screen or other suitable method. The radiating capacitive lines 9 mounted at one side of the electrical insulating plate 8 are connected by electrical conductors 11 indicated by dotted lines in FIGURE 1 and shown schematically in FIGURE 4 which pass through the disc 8 and are in turn connected to a circular conductor plate 13 of a suitable electrical conductive material mounted at the opposite side of the plate 8. The radiating electrical conductor lines 9 are of equal size and spaced an equiangular distance apart, as shown diagrammatically in FIGURES 2 and 3.

Arranged in space fixed relation to the angularly movable disc 8 is an insulator plate 15 positioned at one side of the disc 8, as shown in FIGURES 1 and 2. The plate 15 is also formed of a suitable electrical insulating material having stable mechanical properties such as glass, porcelain, or a suitable electrical insulating plastic material. Applied to the plate 15 are radiating capacitive lines 19 and 21 of an electrical conductive material such as copper, silver, carbon, which may be applied to the plate 15 by the photoetched, silkscreen or other suitable method. The lines 19 radiate inwardly from a circular electrical conductor line 23 while the lines 21 radiate outwardly from a circular electrical conductor line 33. The capacitive lines 19 and 21 are arranged in opposite cooperative relation with the lines 9 on the adjustable plate 8 so that the capacitive lines 9 and capacitive lines 19 and 21 provide opposite capacitor plates, as shown diagrammatically in FIGURE 3.

The radiating capacitive scale lines 19 and 21 may be constructed on the plate 15 by a dividing engine. Further, there may be one hundred and eighty scale lines 19 and one hundred and eighty scale lines 21, corresponding to three hundred and sixty degrees and these scale lines 19 and 21 may be partitioned by the point interval method of separation so as to provide capacitive lines 19 and 21 of equal size spaced an equal one degree angular distance apart, as shown diagrammatically in FIGURE 3.

Similarly, the capacitive lines 9 may be constructed on the plate 8 by a dividing machine with the scale lines 9 being partitioned by the point interval method of seperation so as to provide one hundred and eighty capacitive lines 9 partitioned and spaced an equal two degree angular distance apart and twice the one degree angular distance separating the capacitive lines 19 and 21. In illustrating the invention, the lines 19 of FIGURE 3 are shown separated one degree from the lines 21 while the lines 9 are shown separated two degrees apart.

Further, as shown in FIGURE 2, the capacitive lines 19 are connected by a conductor 23 to an output line 24 leading from one end of a secondary winding 25 of a transformer 27. The secondary winding 25 has a center tap grounded at 29 while the opposite end of the winding 25 is connected by an output line 31 leading to a conductor 33 which is in turn connected to capacitive lines 21. The transformer 27 has a primary winding 26 connected by electrical conductors 37 and 39 leading from a suitable source of alternating current 41.

The resulting geometric configuration is that of a pair of capacitor plates 19 and 21 having opposite electrical charges applied thereto with the angularly adjustable capacitive lines 9 being angularly adjustable intermediate the two capacitor plates 19 and 21 to vary the capacitance between the capacitive lines 9 and 19 and the capacitive lines 9 and 21 in inverse relation.

An elemental capacitor is thus formed between any of the two opposing conductive quanta 9 and 19, and conductive quanta 9 and 21 in which the capacitance becomes maximum when the join between one of the pair of conductive quanta 9–19 or 9–21 becomes minimum while the capacitance becomes minimum between the other pair of conductive quanta upon the join therebetween becoming maximum.

Further, in the aforenoted arrangement, the capacitive lines 19 are connected by the circular conductor 23 to the conductor 24 leading to one terminal of the secondary winding 25 inductively coupled to a primary winding 26 of the transformer 27 and energized from a suitable source of alternating current 42, as shown in FIGURE 2, and which winding 25 has its opposite center tap terminal grounded at 29. Further, the opposite fixed capacitive line 21 is connected through the circular line 33 and electrical conductor 31 to the opposite terminal of the secondary winding 25 which has the center tap 29 grounded.

The capacitive lines 9 carried by the adjustable plate 8 are capacitively coupled to the capacitive lines 19 and 21 and further the lines 9 are electrically connected through conductors 11 to the conductor plate 13 which is in turn connected through a coil spring electrical conductor 35 and line 38 to an input terminal 40 of an amplifier 41 of conventional type having its opposite input terminal 43 grounded.

The output of the amplifier 41 is in turn connected through conductors 45 to the input of a phase discriminator 47 of conventional type. The phase discriminator 47 is excited through control lines 49 from the source of alternating current 42 and is so arranged that there is applied across output lines 51 in conventional manner a signal having a phase relationship corresponding to the phase of the dominating signal applied through input lines 45. The output lines 51 are in turn connected to the input of a phase sensitive voltmeter 53.

The voltmeter 53 has an indicator pointer 55 operable to indicate zero voltage when the phases of the signals applied through the amplifier 41 and phase discriminator 47 are in a balanced condition. However, upon the applied signal being of a phase indicating a greater join between the capacitive line 9 and the capacitive line 19, the indicator pointer 55 will be actuated in one sense. On the other hand, upon the applied signal being of an angle 180° out of phase with the phase of the previous signal as upon the capacitive line 9 having a greater join with the line 21, the indicator pointer 55 will be actuated in an opposite sense.

Figure 5:
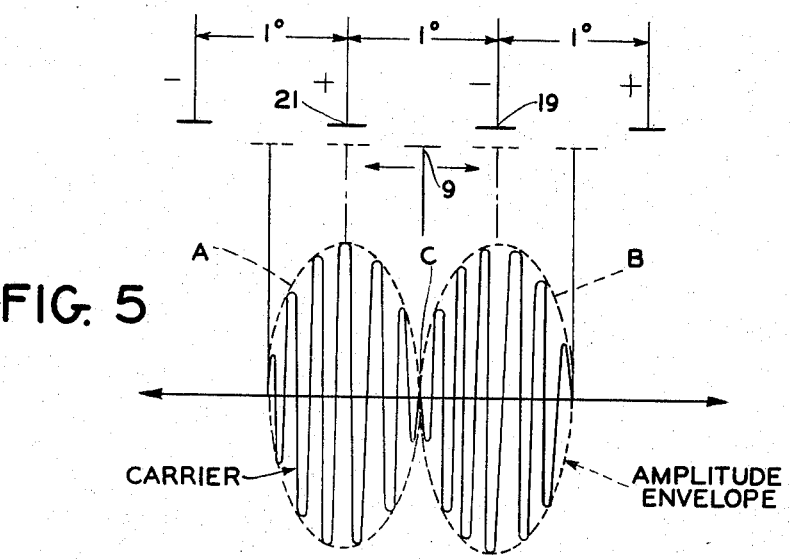
FIGURE 5 is a graphical illustration of the A.C. output carrier frequency and amplitude envelope effected upon adjustment of the variable capacitor plates of FIGURE 4 in the opposite angular senses indicated by the arrows.

However, upon the angular positioning of the adjustable plate 8 being such as to position the lines 9 to an intermediate relationship with the capacitive lines 19 and 21 and the output signals applied through the amplifier 41 and phase discriminator 47 being in a balanced or null relationship, the indicator pointer 55 will be positioned at scale zero. The relation of the capacitive lines 9 carried by the adjustable member 8 relative to the capacitive lines 19 and 21 is indicated diagrammatically in FIGURE 4 and graphically in FIGURE 5 in which it will be seen that as the capacitive line 9 is adjusted toward the capacitive line 21, and away from the capacitive line 19, or towards the left, as shown in FIGURE 5, the amplitude envelope waves of the carrier increase in one sense, as indicated by the letter A to the left of FIGURE 5, while upon the capacitive line 9 being adjusted towards the capacitive line 19 and away from the capacitive line 21, or towards the right, as shown in FIGURE 5, the amplitude envelope, as indicated by the letter B, increases in an opposite sense by the output of carrier waves 180° out of phase with the carrier waves of the amplitude envelope A. However, upon the capacitive line 9 being positioned to a balanced minimum join relationship with the lines 19 and 21 or at a point defining the precise discrete degree point desired, the output signal obtained is a zero or null signal, as indicated graphically at C of FIGURE 5.

It will be seen then that the amplifier 41, phase discriminator 47 and voltmeter 53 form a null detector to indicate on the voltmeter 53 the angular position of the adjusted member 8 relative to the fixed plate 15 to thereby indicate the precisely measured angular position of the shaft, while the coarse indication of the degree count at such point is indicated on the dial 6 in cooperation with the pointer 7 in a conventional manner.

The arrangement is such then that, upon the capacitive lines 9 being angularly adjusted to a position intermediate the pair of lines 19 and 21 and to a position corresponding to the prescribed angular position of the shaft 1, there will be effected a null voltage signal at the phase sensitive voltmeter 53, while upon the capacitive lines 9 carried by the adjustable plate 8 being adjusted to one side or the other in relation to the capacitive lines 19 and 21, a signal at one side or the other of the null signal position will be of a phase causing the voltmeter 53 to indicate through the adjustment of the pointer 55 a sense of the angular error between the distributively coupled scale lines 9, 19, and 21.

Thus, as shown in FIGURE 1, while the shaft 1 may be angularly adjusted by the operator-operative knob 4 for coarse adjustment, in order to effect the fine adjustment necessary to provide the zero or null indication by the indicator pointer 55 of the voltmeter 53, there is provided, as shown in FIGURE 2, a micrometer 50 for actuating a vernier arm 56 which may be releasably fastened to the shaft 1 by suitable adjustment of a fastening bolt 54.

In the aforenoted arrangement, then, the distributively coupled scale or capacitor lines 9, 19, and 21 produce a suppressed carrier modulated signal across the lines 37 and 43, and which signal is applied to the input of amplifier 41 and through lines 45 to the phase discriminator 47 and output lines 51 thereof to the phase sensitive voltmeter 53. The null signal formed across the lines 29 and 38 defines the precise degree point, while the visual scale 6 carried by the shaft 1 cooperates with the pointer 7 to give a visual or coarse indication of the degree count.

Figure 6:
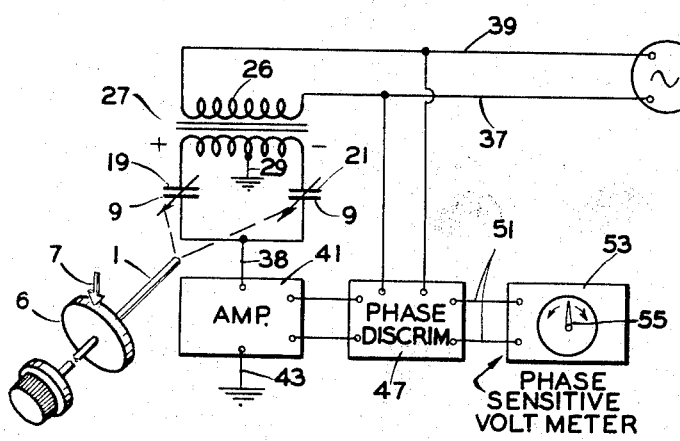
FIGURE 6 is an electrical wiring diagram of the circuit of FIGURES 2 and 4.

In the operation of the aforenoted test standard device, the two distributively coupled circular scales of capacitive lines 9 on the angularly adjustable plate 8 and capacitive lines 19–21 on the fixed plate 15 may be considered to be coupled electrostatically with the quanta 9, 19, and 21 representing condenser plates. The resulting geometric configuration then is that of a pair of annular rings lying in two parallel planes with the centers lying on a common axis with the shaft 1 extending perpendicular to the planes of the annular rings of plate 8 and plate 15 with the one scale plate 8 being free to rotate with respect to the fixed scale plate 15. The capacitive lines 9 and the capacitive lines 19–21 thus provide variable capacitive coupling means in opposite arms of a balanceable bridge circuit as shown diagrammatically in FIGURE 6.

An elemental capacitor is thus formed between any two opposing conductive quanta, the capacitance becoming maximum when the join between the center lines of the quanta becomes minimum. Now assume that the capacitance of the $n$th elemental capacitor varies as the cosine function of scale rotation about a small angle $\theta$ where zero is defined as the position of minimum join. Then, disregarding the constant of proportionality, the elemental capacitance may be written:

(1) $$C_n = \cos N\theta$$

Let $a$ and $b$ denote the real angular errors in the locations of the conductive quanta of scales 9 and 19–21 as laid out by the dividing engine. The division of the scales may now be described by the following equations wherein the 1 subscript may apply to any arbitrary quantum, the others being taken in order:

(2) $$2\pi = \left(\frac{2\pi}{N} + a_1\right) + \left(\frac{2\pi}{N} + a_2\right) + \cdots + \left(\frac{2\pi}{N} + a_N\right)$$

(3) $$2\pi = \left(\frac{2\pi}{N} + b_1\right) + \left(\frac{2\pi}{N} + b_2\right) + \cdots \left(\frac{2\pi}{N} + b_N\right)$$

Since each scale exactly closes on itself with mark N quanta separated by N space intervals, Eqs. 2 and 3 reduce to the condition equations:

(4) $0 = a_1 + a_2 + a_3 + \ldots + a_N$
(5) $0 = b_1 + B_2 + b_3 + \ldots + b_N$ Let the 9 scale be rotated so that the ideal center line of quantum 1 is in exact zero alignment with the ideal center line of 19–21 scale quantum 1. The misalignment or angular errors in the N quantum pairs may then be written from Eqs. 4 and 5.

(6) $0 = (a_1 - b_1) + (a_2 - b_2) + (a_3 - b_3) + \ldots + (a_N - b_N)$

The total capacitance of the coupled scales 9 and 19–21 for this condition is (7) $$C_T = \cos N(a_1 - b_1) + \cos N(a_2 - b_2) + \ldots + \cos N(a_N - b_N)$$

And the derivative signal (current) due to rotation is of the form (8) $$\frac{dC_T}{d\theta} = -N[\sin(a_1 - b_1) + \sin(a_2 - b_2) + \ldots + \sin(a_N - b_N)]$$

It is now possible to examine how the dividing engine errors influence the signal zero crossings expressed by Eq. 8.

Consider the special case where the 19–21 scale is the mirror image of the 9 scale, making $a_1 = b_1$, $a_2 = b_2$, etc. then (9) $$\frac{dC_T}{d\theta} = 0 = -N[\sin(0) + \sin(0) + \ldots + \sin(0)]$$

Let the 9 scale be rotated one period, $2\pi/N$, thus reordering the subscripts of Eq. 8. This gives

(10) $$\frac{dC_T}{d\theta} = -N[\sin(a_1 - a_2) + \sin(a_2 - a_3) + \ldots + \sin(a_N - a_1)]$$

Expanding Eq. 10 into a sum of N infinite series produces the array of Eq. 11.

(11) $$\frac{dC_T}{d\theta} = -N\left[(a_1 - a_2) - \frac{(a_1 - a_2)^3}{3!} + \frac{(a_1 - a_2)^5}{5!} - \cdots\right]$$
$$-N\left[(a_2 - a_3) - \frac{(a_2 - a_3)^3}{3!} + \frac{(a_2 - a_3)^5}{5!} - \cdots\right]$$
$$-N\left[\cdots \qquad \cdots \qquad \cdots \cdots\right]$$
$$-N\left[(a_N - a_1) - \frac{(a_N - a_1)^3}{3!} + \frac{(a_N - a_1)^5}{5!} - \cdots\right]$$

From Eq. 4 it is clear that the 1st power terms sum to zero. The higher power terms, however, do not necessarily sum to zero. It might then appear that the reckoning of the error in the zero crossings deteriorates to a brute-force computation of Eq. 11. Fortunately this is not the case. The real errors of the dividing engine are very small relative to the arc length of the scale period, thus placing the expansions of Eq. 11 in a small region about zero where the sine function approaches linearity. In this case the 1st power terms, only, are significant in determining the zero crossing, and Eq. 11 reduces to

(12) $$\frac{dC_T}{d\theta} = 0 = -N[(a_1 - a_2) + (a_2 - a_3) + \ldots + (a_N - a_1)]$$

Thus Eq. 12 proves that no angular errors exist at all N discrete and equally spaced points on the circle of revolution of the distributively coupled scales. Heuristically, it could be guessed that the errors "tend to average out," but the proof in detail reveals the far more forceful conclusion that the signal errors produced by N capacitor element pairs cancel each other absolutely at N discrete points. In physical terms the salutary results of the above proof may be obtained when, and only when, the signal response of each of the N element pairs is linear and of identical slope in the vicinity of the N discrete angle points. These conditions are obtainable in practical terms.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. An apparatus for determining a precise angular position of a rotatable part under test, comprising a shaft operatively connected to said part, bearing means for supporting the shaft, means carried by the shaft for providing a visual indication of the degree count at the angular position of the shaft and part, first and second circular scales, the first scale being fixedly mounted and the second scale being carried by said shaft and arranged to be angularly adjusted relative to the first scale, the first scale including three hundred and sixty radiating capacitive lines equally angularly spaced apart, the second scale including one hundred and eighty capacitive lines equally angularly spaced apart, the capacitive lines of the first and second scales being capacitively coupled, a source of alternating current, inductive coupling means operatively connected to said source and including first and second opposite output conductors and a third intermediate output conductor, said first and second output conductors applying currents of opposite phase to alternate capacitive lines of the first scale, an electrical signal output conductor leading from the capacitive lines of the second scale, an amplifier having an input across said signal output conductor and said third intermediate output conductor, the amplifier having an output, a phase discriminator having an input connected to the output of the amplifier, the phase discriminator having an output, a phase sensitive voltmeter having an input operatively connected to the output from the phase discriminator, an indicator adjustable by the voltmeter to indicate the sense of an out of balance relation between the adjusted position of the scale lines of the second plate and the scale lines of the first plate, and the indicator of the voltmeter being operable to indicate the coupling between the capacitive lines of the first and second scales being in a balanced relation and upon the shaft being adjusted to a precise angular position corresponding to the indicated degree count.

2. The combination defined by claim 1 including first operator-operative means to angularly adjust the shaft and the visual indication means to a position approximating a predetermined degree count, and second operator-operative micrometer means connected to the shaft to effect a further angular adjustment of the second scale relative to the first scale so as to balance the coupling relation between the capacitive lines of the first and second scales upon the shaft being adjusted to a precise angular position corresponding to said predetermined degree count.

3. An apparatus for determining a precise angular position of a rotatable part of a device under test comprising a shaft operatively connected to said part, bearing means for supporting the shaft, means carried by the shaft for visually providing an indication of an angular position of the shaft approximating a predetermined degree count, a first variable capacitive coupling means, a second variable capacitive coupling means, a bridge circuit including said first and second variable capacitive coupling means at opposite arms thereof, means operatively connecting said shaft to said first and second variable capacitive coupling means to inversely adjust the capacitance of said first and second variable capacitive coupling means to effect a differential output signal from said bridge circuit, means responsive to said signal for indicating an adjustment of the shaft to a precise angular position corresponding to said predetermined degree count, a first operator-operative means to angularly adjust the shaft and visual indication means to a position approximating said predetermined degree count, second operator-operative micrometer means connected to the shaft to effect a further angular adjustment of the first and second variable capacitive coupling means so as to balance said bridge circuit upon the shaft being adjusted to a precise angular position corresponding to said predetermined degree count, the first and second variable capacitive coupling means includes a first plate carried by said shaft, a second plate fixedly mounted relative to said first plate, a plurality of radiating first capacitive lines mounted on said first plate, said first capacitive lines being equally angularly spaced apart, a plurality of radiating second capacitive lines mounted on the second plate, said second capacitive lines being equally angularly spaced apart and arranged upon said second plate in cooperative relation to the first capacitive lines on the first plate, the capacitive lines of the first and second capacitive plates being so arranged that the second capacitive lines may be coupled electrostatically to the first capacitive lines so as to provide the first and second variable capacitive coupling means, and the first plate being angularly movable so as to adjust the first capacitive lines relative to the second capacitive line so as to inversely adjust the capacitance of the first and second variable capacitive coupling means.

4. An apparatus for determining a precise angular position of a rotatable part of a device under test comprising a shaft operatively connected to said part, bearing means for supporting the shaft, means carried by the shaft for visually providing an indication of an angular position of the shaft approximating a predetermined degree count, a first variable capacitive coupling means, a second variable capacitive coupling means, a bridge circuit including said first and second variable capacitive coupling means at opposite arms thereof, means operatively connecting said shaft to said first and second variable capacitive coupling means to inversely adjust the capacitance of said first and second variable capacitive coupling means to effect a differential output signal from said bridge circuit, means responsive to said signal for indicating an adjustment of the shaft to a precise angular position corresponding to said predetermined degree count, the first and second variable capacitive coupling means includes a first plate carried by said shaft, a second plate fixedly mounted relative to said first plate, a plurality of radiating first capacitive lines mounted on said first plate, said first capacitive lines being equally angularly spaced apart, a plurality of radiating second capacitive lines mounted on the second plate, said second capacitive lines being equally angularly spaced apart and arranged upon said second plate in cooperative relation to the first capacitive lines on the first plate, the capacitive lines of the first and second capacitive plates being so arranged that the second capacitive lines may be coupled electrostatically to the first capacitive lines so as to provide the first and second variable capacitive coupling means, and the first plate being angularly movable so as to adjust the first capacitive lines relative to the second capacitive line so as to inversely adjust the capacitance of the first and second variable capacitive coupling means.

References Cited

UNITED STATES PATENTS

| 2,111,442 | 3/1938 | West. | |
| 2,674,729 | 4/1954 | Carter | 340—200 |
| 3,102,413 | 9/1963 | Serdahely | 73—1 |
| 3,221,256 | 11/1965 | Walden | 340—200 X |
| 3,222,591 | 12/1965 | Mynall | 340—200 X |

LOUIS R. PRINCE, *Primary Examiner.*

DAVID SCHONBERG, *Examiner.*

S. C. SWISHER, *Assistant Examiner.*